United States Patent
Zhu

(10) Patent No.: US 10,135,923 B2
(45) Date of Patent: Nov. 20, 2018

(54) DATA TRANSFER METHOD AND SYSTEM

(71) Applicant: TENCENT TECHNOLOGY (SHENZHEN) COMPANY LIMITED, Shenzhen (CN)

(72) Inventor: Zhongyuan Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 633 days.

(21) Appl. No.: 14/082,246

(22) Filed: Nov. 18, 2013

(65) Prior Publication Data

US 2014/0082057 A1 Mar. 20, 2014

Related U.S. Application Data

(63) Continuation of application No. PCT/CN2013/081281, filed on Aug. 12, 2013.

(30) Foreign Application Priority Data

Aug. 31, 2012 (CN) .......................... 2012 1 0318732

(51) Int. Cl.
- *H04L 29/08* (2006.01)
- *H04W 36/14* (2009.01)
- *H04W 4/00* (2018.01)

(52) U.S. Cl.
CPC .......... *H04L 67/1097* (2013.01); *H04L 67/06* (2013.01); *H04W 4/00* (2013.01); *H04W 36/14* (2013.01)

(58) Field of Classification Search
CPC .... H04W 4/00; H04W 36/14; H04L 67/1097; H04L 67/06
See application file for complete search history.

(56) References Cited

U.S. PATENT DOCUMENTS

| 9,055,387 B1* | 6/2015 | Boyle | .................. H04W 4/003 |
| 2004/0233930 A1* | 11/2004 | Colby, Jr. | ............. G06F 1/1632 370/464 |

(Continued)

FOREIGN PATENT DOCUMENTS

| CN | 101588617 A | 11/2009 |
| CN | 101895967 A | 11/2010 |

(Continued)

OTHER PUBLICATIONS

Calhoun (Optimization based on connection speed, published on Sep. 14, 2010, http://davidbcalhoun.com/2010/using-navigator-connection-android/, retrieved on Nov. 16, 2016).*

(Continued)

*Primary Examiner* — Abdulkader M Alriyashi

(74) *Attorney, Agent, or Firm* — Anova Law Group, PLLC

(57) ABSTRACT

A data transfer method is provided for a terminal coupled to a server by one or more networks. The method includes detecting a connection type of a current network between the terminal and the server and performing data transfer between the terminal and the server when it is detected that the connection type of the current network is a wireless fidelity (WiFi) connection. Further, the method includes suspending data transfer between the terminal and the server when it is detected that the connection type of the current network is a non-WiFi connection.

6 Claims, 5 Drawing Sheets

(56) References Cited

U.S. PATENT DOCUMENTS

| | | | | |
|---|---|---|---|---|
| 2009/0088188 A1* | 4/2009 | Wormald | ................ | H04W 4/18 |
| | | | | 455/466 |
| 2009/0284611 A1 | 11/2009 | Wood et al. | | |
| 2010/0011052 A1* | 1/2010 | Gharabally | ........ | H04N 1/00204 |
| | | | | 709/203 |
| 2011/0040867 A1 | 2/2011 | Kalbag | | |
| 2011/0078325 A1* | 3/2011 | Vanover | .................. | H04L 63/10 |
| | | | | 709/232 |
| 2013/0102279 A1* | 4/2013 | Lee | ........................ | H04M 1/67 |
| | | | | 455/410 |

FOREIGN PATENT DOCUMENTS

| | | | |
|---|---|---|---|
| CN | 101951404 A | | 1/2011 |
| CN | 102144421 A | | 8/2011 |
| CN | 102214211 A | | 10/2011 |
| CN | 102238204 A | | 11/2011 |

OTHER PUBLICATIONS

The World Intellectual Property Organization (WIPO) International Search Report for PCT/CN2013/081281 dated Nov. 21, 2013.
The State Intellectual Property Office of the People's Republic of China (SIPO) Office Action 1 for 201210318732.6 dated Jul. 4, 2017.
The State Intellectual Property Office of the People's Republic of China (SIPO) Office Action 2 for 201210318732.6 dated Feb. 26, 2018 8 Pages (including translation).

\* cited by examiner

DATA TRANSFER METHOD AND SYSTEM

CROSS-REFERENCES TO RELATED APPLICATIONS

The application is a continuation application of PCT Patent Application No. PCT/CN2013/081281, filed on Aug. 12, 2013, which claims priority of Chinese Patent Application No. 201210318732.6, filed on Aug. 31, 2012, the entire contents of which are hereby incorporated by reference.

FIELD OF THE INVENTION

The present invention generally relates to Internet technologies and, more particularly, to methods and systems for transferring data.

BACKGROUND

With continuous development of network technology, data transfer is increasingly used in a wide range of applications. Users not only can upload local data from terminals to remote servers through communication networks, but also can download data on the remote server to local terminals through the networks.

When using existing technologies for data transfer, regardless of what connection type of the current network, the user can always choose to start the data transfer to upload local data to the remote server through a network, or to download data on the remote server to the local terminal. If the data transfer is interrupted, the user needs to choose again in order to continue the data transfer.

However, because the user needs to choose again to continue the data transfer after the data transfer is interrupted, such data transfer is not flexible. Further, because, regardless of what connection type of the current network, the data transfer is always performed, it may incur to the user too much amount of data traffic and cost, affecting the user experience.

The disclosed methods and systems are directed to solve one or more problems set forth above and other problems.

BRIEF SUMMARY OF THE DISCLOSURE

One aspect of the present disclosure includes a data transfer method for a terminal coupled to a server by one or more networks. The method includes detecting a connection type of a current network between the terminal and the server and performing data transfer between the terminal and the server when it is detected that the connection type of the current network is a wireless fidelity (WiFi) connection. Further, the method includes suspending data transfer between the terminal and the server when it is detected that the connection type of the current network is a non-WiFi connection.

Another aspect of the present disclosure includes a data transfer system. The data transfer system is coupled to a server by one or more networks. The data transfer system includes a first detection module and a transfer module. The first detection module is configured to detect a connection type of a current network between the terminal and the server. The transfer module is configured to, when the first detection module detects that the connection type of the current network is a wireless fidelity (WiFi) connection, perform data transfer between the data transfer system and the server. The data transfer module is also configured to, when the first detection module detects that the connection type of the current network is a non-WiFi connection, suspend data transfer between the data transfer system and the server.

Another aspect of the present disclosure includes a mobile terminal coupled to a server by one or more networks. The mobile terminal includes a communication interface for accessing the one or more networks, a memory module, and a processor coupled to the memory module and the communication interface for implementing a data transfer process. The processor is configured to detect a connection type of a current network between the terminal and the server and, when it is detected that the connection type of the current network is a wireless fidelity (WiFi) connection, to perform data transfer between the terminal and the server. Further, the processor is also configured to, when it is detected that the connection type of the current network is a non-WiFi connection, suspend data transfer between the terminal and the server.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 7:
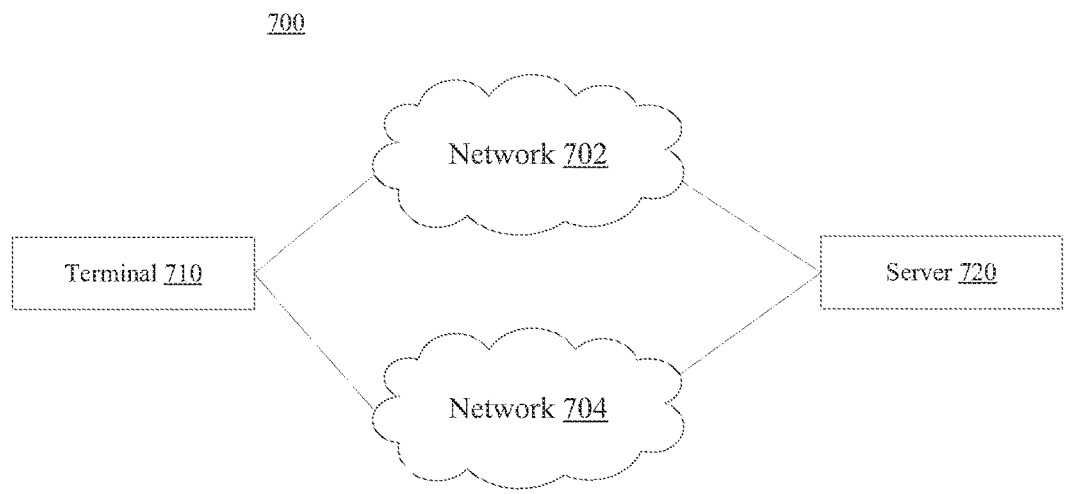
FIG. 7 illustrates an operating environment incorporating certain aspects of the disclosed embodiments.

FIG. 7 illustrates an exemplary operating environment 700 incorporating certain disclosed embodiments. As shown in FIG. 7, environment 700 may include a terminal 710, a server 720, a first network 702, and a second network 704. Although only one terminal 710, one server 720, and two networks 702 and 704 are shown in the environment 700, any number of terminals, servers, and/or networks may be included, and other devices may also be included.

A terminal, as used herein, may refer to any appropriate user terminal with certain computing capabilities, such as a smart phone, a personal computer (PC), a work station computer, a hand-held computing device (tablet), a mobile phone, or any other user-side computing device. A terminal may run certain client software programs to implement certain functionalities, such as social networking client-side functions, short message client-side functions, etc.

A server, as used herein, may refer to one or more server computers configured to provide certain server functionalities, such as social networking sites, web browsing, database management, and search engines. A server may also include one or more processors to execute computer programs in parallel.

The server 720 and the terminal 710 may be coupled through one or more communication networks for information exchange, such as IM (instant message) communication, web browsing. Data transfer may be initiated from terminal 710 to upload data to and/or download data from server 720 via the networks 702 and 704.

The networks 702 and 704 may include any appropriate types of communication networks for providing network connections to the server 720 and terminal 710, such as the Internet or other types of computer networks or telecommunication networks, either wired or wireless. For example, network 702/704 may be a cellular network, a wireless fidelity (WIFI) network, a local area network (LAN), a wide area network (WAN), a personal area network (PAN), or any other type of network.

Figure 8:
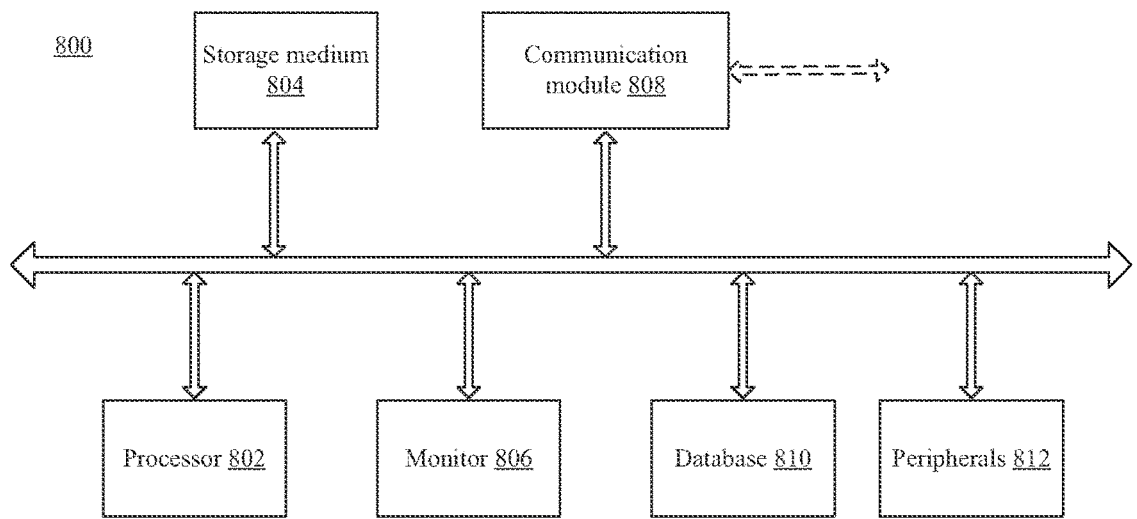
FIG. 8 illustrates a block diagram of an exemplary computer system consistent with the disclosed embodiments.

Server 720 and/or terminal 710 may be implemented on any appropriate computing platform. FIG. 8 shows a block diagram of an exemplary computer system 800 capable of implementing server 720 and/or terminal 710.

As shown in FIG. 8, computer system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as ROM, RAM, flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network. Database 810 may include one or more databases for storing certain data and for performing certain operations on the stored data, such as database searching.

Figure 1:
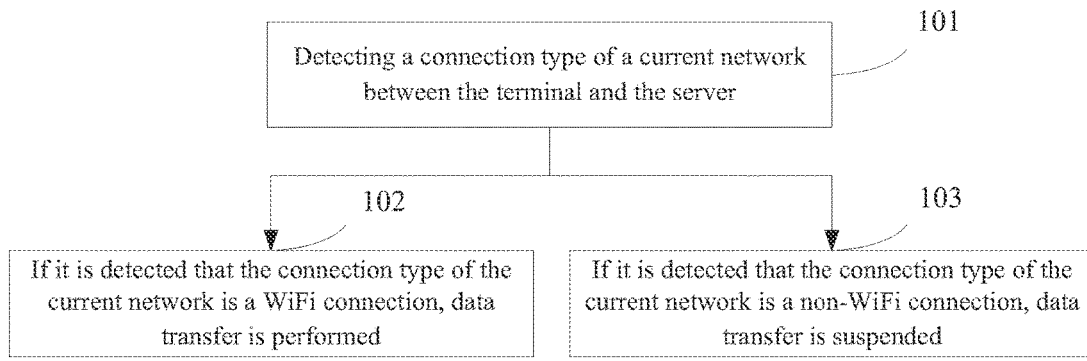
FIG. 1 illustrates a flowchart of an exemplary data transfer process consistent with the disclosed embodiments.

In operation, server 720 and/or terminal 710 may perform certain methods to achieve data transfer through different types of networks. FIG. 1 illustrates an exemplary data transfer process consistent with the disclosed embodiments. As shown in FIG. 1, the data transfer process includes the following steps:

Step 101: detecting a connection type of a current network between the terminal and the server (e.g., the current network connecting the terminal to the server).

Before detecting the connection type, any screen-click event or key-press event from a user of the terminal to transfer data is detected. If any screen-click event or key-press event is detected, the detection of the connection type the current network is performed.

Additionally and/or alternatively, any network switching event (i.e., the current network is switched to a different network). If any network switching event is detected, the detection of the connection type the current network is performed.

Step 102: if it is detected that the connection type of the current network is a WiFi connection, data transfer is performed.

Step 103: if it is detected that the connection type of the current network is a non-WiFi connection, data transfer is suspended.

Further, if it is detected that the connection type of the current network is a non-WiFi connection, the user is prompted whether the user wants to transfer the data. If it is determined that the user selects or confirms data transfer, data transfer is performed. On the other hand, if it is determined that the user does not select or confirm data transfer, data transfer is suspended.

Specifically, the data transfer includes, but not limited to, uploading data of an unfinished upload task to the remote server or uploading local data corresponding to the user's selection to the remote server. The data transfer may also include downloading data of an unfinished download task from the remote server or downloading data corresponding to the user's current selection from the remote server.

If the data of an unfinished download task from the remote server or the data corresponding to the user's current selection includes an image, and the remote server stores both a high-definition image and a standard-definition image of that image, the terminal downloads the high-definition image from the remote server if it is detected that the connection type of the current network is a WiFi connection. Otherwise, the terminal downloads the standard-definition image from the remote server if it is detected that the connection type of the current network is a non-WiFi connection.

Thus, by detecting the current network connection type, data transfer can be performed when the current network connection type is a WiFi connection. The data transfer can be performed without user's participation, thereby increasing the data transfer flexibility. Further, transmitting data with a WiFi connection can save user's data traffic and cost, improving user experience.

Figure 2:
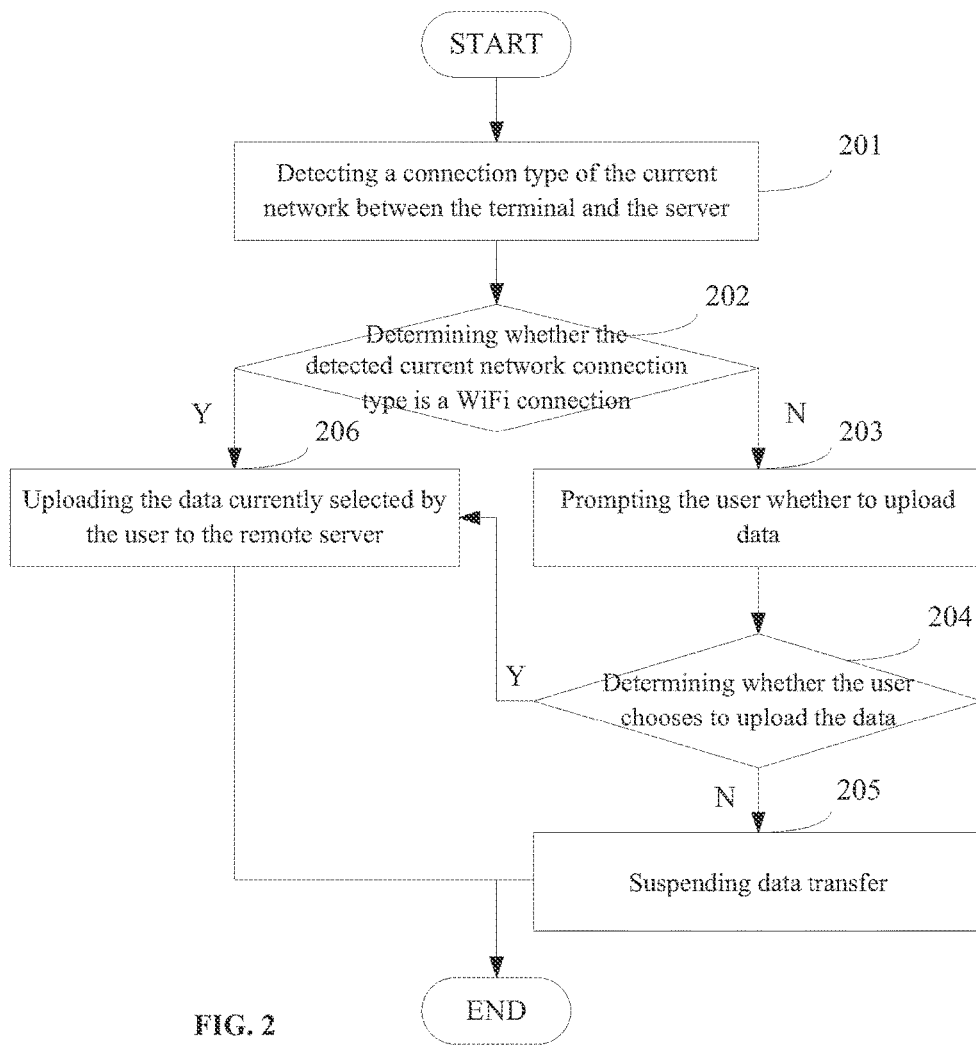
FIG. 2 illustrates a flowchart of another exemplary data transfer process consistent with the disclosed embodiments.

FIG. 2 illustrates another data transfer process consistent with the disclosed embodiments. Particularly, the data transfer process is used to upload local data from the terminal to the remote server. As shown in FIG. 2, the data transfer process includes following steps:

Step 201: detecting a connection type of the current network between the terminal and the server (e.g., the current network connecting the terminal to the server).

The network connection types include, but are not limited to, a WiFi connection, a mobile network connection, etc. Any appropriate connection type may be used. The terminal may include certain client software for detecting the current network connection type, such as applications at the operating system level or Web applications. When applications at the operating system level are used, the current network connection type may be detected by using a device API (Application Programming Interface). When Web applications are used, the current network connection type may be detected by using the device API or an API provided by a web browser.

Further, the detection of the current network connection type may be triggered in certain ways. For example, a first trigger method is to detect any screen-click event or key-press event from the user for data transfer. If any screen-click event or key-press event is detected, the detection on the connection type of the current network is triggered.

For example, if the user chooses to upload file A to the remote server, after the user selects the file A, the user clicks upload option on the screen or press a corresponding key. The screen-click event or key-press event is detected, and the detection of the current network connection type is triggered.

The second trigger method is to detect a network switching event. If a network switching event is detected, the detection of the current network connection type is also triggered.

The network switching event can occur at any time or any place. For example, when the terminal in an Area A, the network connection type is a mobile network connection. However, when the terminal moves from the Area A to a different Area B, the network connection type is switched from the mobile network connection to a WiFi connection, and a network switching event occurs. After the network switching event is detected, the detection of the current network connection type is triggered.

It should be noted that the timing for detecting the current network connection type is not limited. That is, the detection of the current network connection type may be performed after the triggering events, or may be performed at any appropriate time. For example, the detection of the current network connection type may be triggered periodically, and a preconfigured period may be set based on a particular application.

Step 202: determining whether the detected current network connection type is a WiFi connection. If current network connection type is the WiFi connection, Step 206 is performed; and if current network connection type is not the WiFi connection, Step 203 is performed.

The reason for detecting the WiFi connection type is that, through a WiFi connection and under normal circumstances, even automatic data transfer will not have an impact on the data traffic and the cost of the user (e.g., the amount of data traffic allowed for the user may be limited in a cellular network). Thus, if it is determined that the current network connection type is a WiFi connection, automatic data transfer can be enabled on the terminal, such that the user's data traffic and cost can be saved, thereby enhancing the user experience. Of course, the WiFi connection type is used as an example, any high-speed and low-cost or free network connection type may be used, such as a LAN connection type, etc.

Step 203: prompting the user whether to upload data or otherwise enable data transfer. Specifically, if it is detected that the current network connection type is a non-WiFi connection (Step 202), in order to meet user's demand for data transfer, the user is prompted whether to take the step of uploading data. For example, the user may be prompted by a prompt bar or a pop-up window to provide options for selecting whether to upload data. Any appropriate prompting method may be used.

Step 204: determining whether the user chooses to upload the data. If the user chooses to upload the data, the process goes to Step 206. If the user chooses not to upload the data, the process goes to Step 205.

Based on the user's selection from the prompt, the user's decision on whether to continue the data transfer under the non-WiFi connection type may be determined. If the user confirms that the data transfer is to be continued even under the non-WiFi connection type, the process continues to Step 206. On the other hand, if the user does not choose the option of continuing the data transfer, or the user does not choose any prompted options, it is determined that the user chooses not to upload data, and the process goes to Step 205.

Step 205: suspending data transfer, and the process completes. That is, after detecting that the current network connection type is a non-WiFi connection (Step 204), and determining that the user selects not to upload the data, the data transfer is suspended and the process completes.

Step 206: uploading the data currently selected by the user to the remote server, and the process completes. Specifically, when it is detected that the current network connection type is a WiFi connection, or when it is detected that the current network connection type is a non-WiFi connection but it is determined that the user chooses continuing data transfer, the data selected by the user is then uploaded to the remote server.

The local data selected by the user may include, but not limited to, images, text, software, audio and video, and other types of data. Any contents or data type may be used with respect to the local data.

Further, during data transfer, if the network connection is interrupted or other reasons cause the interruption of the data transfer, the data uploading might not be completed in time. The terminal may continue detecting the current network connection type and, when it is detected that the current network connection type is a WiFi connection, automatically start the unfinished data transfer (e.g., uploading the data). Thus, even without the user's selection or operation, the data transfer can be performed automatically.

Figure 3:
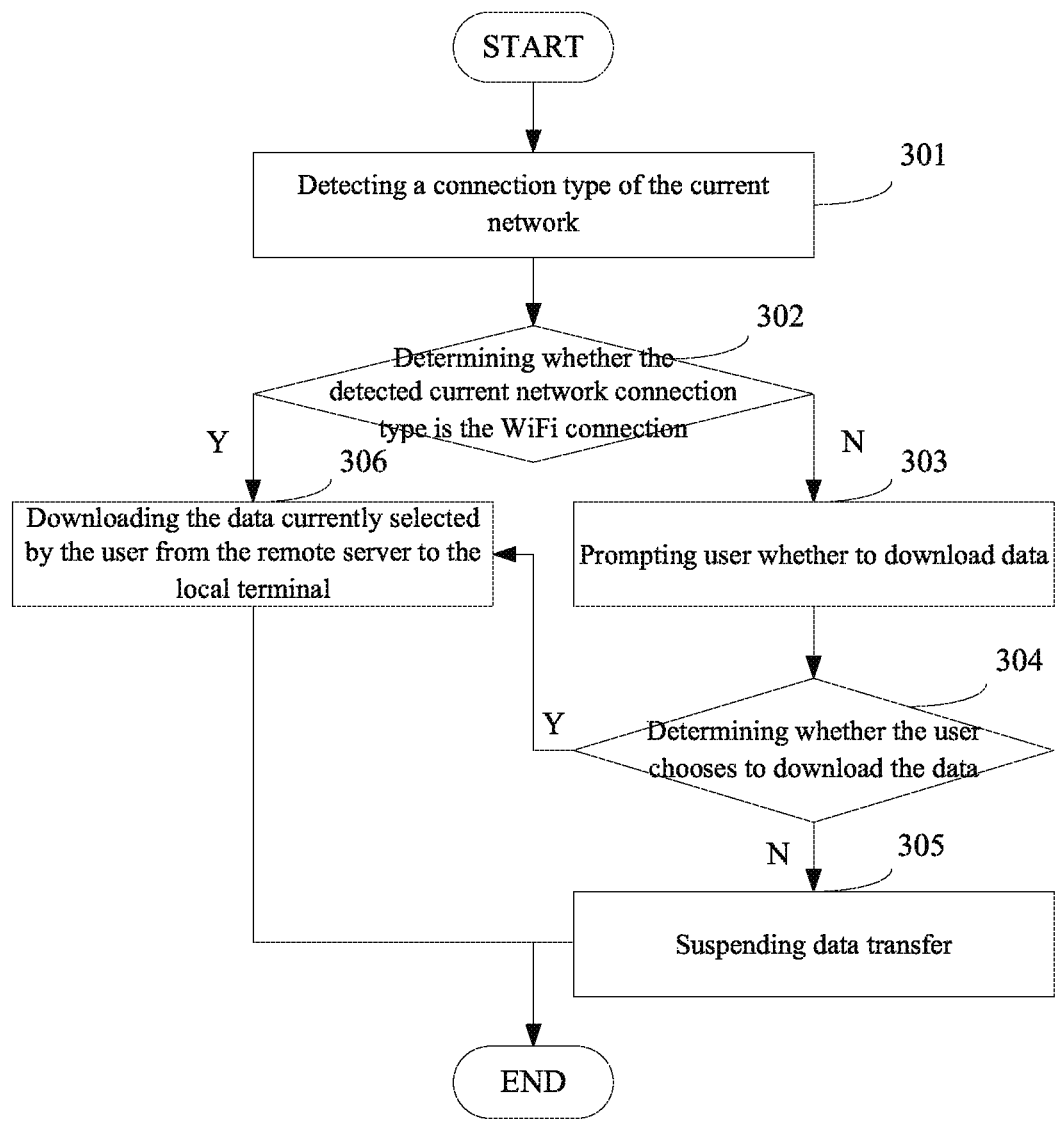
FIG. 3 illustrates a flowchart of another exemplary data transfer process consistent with the disclosed embodiments.

FIG. 3 illustrates another data transfer process consistent with the disclosed embodiments. Particularly, the data transfer process is used to download data from the remote server to the terminal. As shown in FIG. 3, the data transfer process includes following steps:

Step 301: detecting a connection type of the current network between the terminal and the remote server, similar to Step 201 described above.

Step 302: determining whether the detected current network connection type is the WiFi connection. If current network connection type is the WiFi connection, Step 306 is performed; if current network connection type is not the WiFi connection, Step 303 is performed.

Step 303: prompting user whether to download data or otherwise enable data transfer. Specifically, if it is detected that the current network connection type is a non-WiFi connection (Step 302), in order to meet user's demand for data downloading, the user is prompted whether to take the step of downloading data. For example, the user may be prompted by a prompt bar or a pop-up window to provide options for selecting whether to download data. Any appropriate prompting method may be used.

Step 304: determining whether the user chooses to download the data. If the user chooses to download the data, the process goes to Step 306. If the user chooses not to download the data, the process goes to Step 305.

Based on the user's selection from the prompt, the user's decision on whether to continue the data transfer under the non-WiFi connection type may be determined. If the user confirms that the data transfer is to be continued even under the non-WiFi connection type, the process continues to Step 306. On the other hand, if the user does not choose the option of continuing the data transfer, or the user does not choose any prompted option, it is determined that the user chooses not to download data, and the process goes to Step 305.

Step 305: suspending data transfer, and the process completes. That is, after detecting that the current network connection type is a non-WiFi connection (Step 304), and determining that the user selects not to download the data, the data transfer is suspended and the process completes.

Step 306: downloading the data currently selected by the user from the remote server to the local terminal, and the process completes. Specifically, when it is detected that the current network connection type is a WiFi connection, or when it is detected that the current network connection type is a non-WiFi connection but it is determined that the user chooses to continue downloading data, the data selected by the user is then downloaded from the remote server.

The local data selected by the user for downloading may include, but not limited to, images, text, software, audio and video, and other types of data. Any contents or data type may be used.

Further, during data transfer, if the network connection is interrupted or the other reasons cause the interruption of the data transfer, the data downloading might not be completed in time. The terminal may continue detecting the current network connection type and, when it is detected that the current network connection type is a WiFi connection, automatically start the unfinished data transfer (e.g., downloading the data). Thus, even without the user's selection or operation, the data transfer can be performed automatically.

Figure 4:
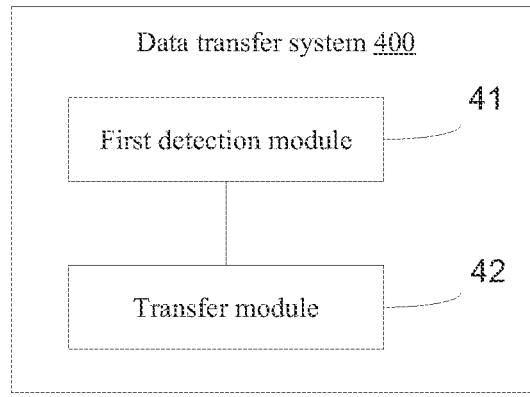
FIG. 4 illustrates an exemplary data transfer system consistent with the disclosed embodiments.
Figure 5:
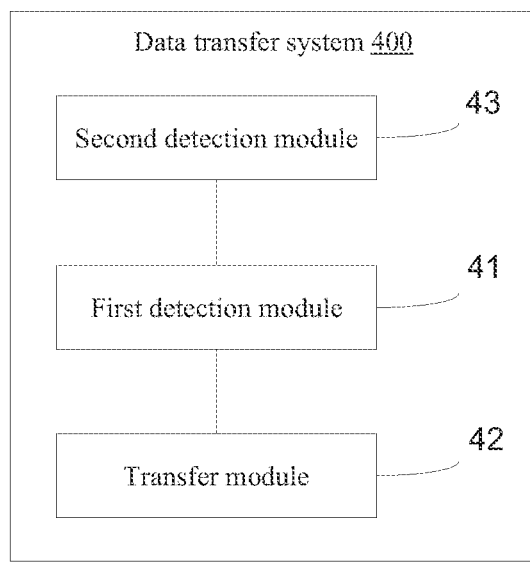
FIG. 5 illustrates another exemplary data transfer system consistent with the disclosed embodiments.

FIGS. 4-5 illustrate an exemplary data transfer system consistent with the disclosed embodiments. As shown in FIG. 4, the data transfer system 400 includes a first detection module 41 and a transfer module 41.

The first detection module 41 is configured to detect the current network connection type, and the transfer module 42 is configured to, if the first detection module 41 detects that the current network connection type is a WiFi connection, perform the data transfer. On the other hand, if the first detection module 41 detects that the current network connection type is a non-WiFi connection, the transfer module 42 suspends the data transfer.

Further, referring to FIG. 5, the data transfer system further includes a second detection module 43. The second detection module 43 is configured for detecting any screen-click event or key-press event from a user of the terminal for data transfer. If the second detection module 43 detects any user screen-click event or key-press event, the second detection module 43 triggers the first detection module 41 to detect the current network connection type.

The second detection module 43 may also be configured for detecting a network switching event. If the second detection module 43 detects a network switching event, the second detection module 43 may trigger the detection module 41 to perform the detection of the current network connection type.

Figure 6:
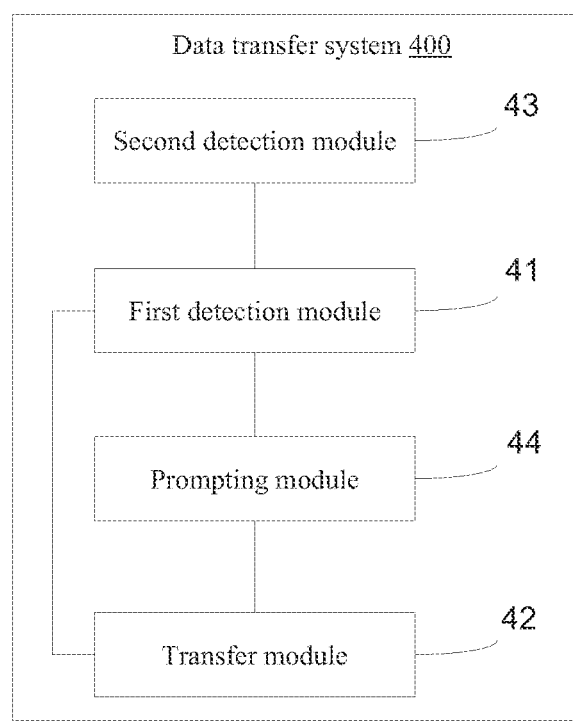
FIG. 6 illustrates another exemplary data transfer system consistent with the disclosed embodiments.

Further, referring to FIG. 6, the data transfer system further includes a prompting module 44. The prompting module 44 is configured to prompt the user whether to continue data transfer, when the first detection module 41 detects that the current network connection type is a non-WiFi connection. If the user selects or confirms data transfer, transfer module 42 performs the data transfer. On the other hand, if transfer module 42 determines that the user does not select or confirm data transfer, transfer module 42 suspends the data transfer.

Further, if the data of an unfinished download task from the remote server or the data corresponding to the user's current selection includes an image, and the remote server stores both a high-definition image and a standard-definition image corresponding to the image, the transfer module 42 downloads the high-definition image from the remote server if it is detected that the connection type of the current network is a WiFi connection. The transfer module 42 downloads the standard-definition image from the remote server if it is detected that the connection type of the current network is a non-WiFi connection.

The above-described processes and systems may be implemented on hardware, or may be implemented as software programs instructing relevant hardware. The software program may be stored in a computer-readable storage medium, such as read-only memory (ROM), magnetic disk, and/or optical disk, etc.

The above descriptions merely disclose certain embodiments of the present invention, and are not intended to limit the scope of the present invention. Without departing from the spirit and principles of the present invention, any modifications, equivalent replacements, and improvements, etc., should be included in the protection scope of the present invention.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods and systems can be used in a variety of internet applications. By using the disclosed methods and systems, the current network connection type is detected, and data transfer is performed when the current network connection type is a WiFi connection. Thus, the data transfer can be performed without user's participation, thereby increasing the data transfer flexibility and saving user's data traffic usage and cost. Further, any unfinished uploading or downloading task can be performed automatically when the current network connection type is detected as the WiFi connection.

What is claimed is:

1. A data transfer method for a terminal coupled to a server by one or more networks, comprising:
   detecting a screen-click event or a key-press event from a user of the terminal to transfer data;
   when the screen-click event or the key-press event is detected, triggering the terminal to detect a connection type of a current network between the terminal and the server by using an API (Application Programming Interface) provided by a web browser on the terminal;
   when the terminal detects that the connection type of the current network is a wireless fidelity (WiFi) connection, performing data transfer between the terminal and the server; and
   when the terminal detects that the connection type of the current network is a non-WiFi connection,
      prompting the user of the terminal whether to continue the data transfer;
      when the terminal determines that the user makes a selection to continue the data transfer, continuing performing the data transfer, wherein the data includes image data, and continuing performing the data transfer includes:
         detecting one or more network switching event during the data transfer;
         in response to each of the one or more detected network switching event, triggering the terminal to detect the connection type of the current network;
         determining that both a high-definition image and a standard-definition image corresponding to the image data are available;
         automatically downloading the high-definition image from the server without prompting the user if it is detected that the connection type of the current network is a WiFi connection; and automatically downloading the standard-definition image from the server after prompting the user if it is detected that the connection type of the current network is a non-WiFi connection;

when the terminal determines that the user does not choose any prompted option related to whether to continue the data transfer, suspending the data transfer between the terminal and the server;

after suspending the data transfer between the terminal and the server, continuing detecting the current network connection type; and when the terminal detects that the connection type of the current network is the WiFi connection, uploading data of an unfinished upload task to the server, or downloading data of an unfinished download task from the server, wherein the unfinished upload task or the unfinished download task is a previously suspended task in response to the detected network switching event of the switch from the WiFi connection to the non-WiFi connection, wherein the method further comprises:

setting a preconfigured period based on a particular application; and triggering the detection of the current network connection type periodically based on the preconfigured period.

2. The method according to claim 1, wherein when the terminal detects that the connection type of the current network is the WiFi connection, performing the data transfer between the terminal and the server includes:

uploading, to the server, local data corresponding to a selection of the user; or downloading, from the server, data corresponding to a selection of the user.

3. A data transfer system coupled to a server by one or more networks, comprising at least one processor, a memory, and a plurality of program modules stored in the memory and to be executed by the at least one processor, the plurality of program modules comprising:

a first detection module configured to detect a connection type of a current network between a terminal and the server by using an API (Application Programming Interface) provided by a web browser on the terminal;

a second detection module configured to detect a screen-click event or a key-press event from a user of the data transfer system to transfer data, wherein, when the second detection module detects the screen-click event or the key-press event, the second detection module triggers the first detection module to detect the connection type of the current network;

a transfer module configured to:

when the first detection module detects that the connection type of the current network is a wireless fidelity (WiFi) connection, perform data transfer between the data transfer system and the server; and when the first detection module detects that the connection type of the current network is a non-WiFi connection, suspend data transfer between the data transfer system and the server;

a prompting module configured to, when the first detection module detects that the connection type of the current network is a non-WiFi connection, prompt the user whether to perform the data transfer;

wherein the transfer module is further configured to:

when the prompting module determines that the user makes a selection to continue to perform the data transfer, continue to perform the data transfer, wherein the data includes image data;

the second detection module is configured to detect one or more network switching event during the data transfer performed by the transfer module; and in response to each of the one or more detected network switching event, trigger the first detection module to detect the connection type of the current network;

the transfer module is further configured to: determine that both a high-definition image and a standard-definition image corresponding to the image data are available;

automatically download the high-definition image from the server without prompting the user if it is detected that the connection type of the current network is a WiFi connection; and automatically download the standard-definition image from the server after prompting the user if it is detected that the connection type of the current network is a non-WiFi connection; and when the prompting module determines that the user does not choose any prompted option related to whether to continue the data transfer, suspend the data transfer;

after the transfer module suspends the data transfer, the first detection module is further configured to continue detecting the current network connection type; and when the first detection module detects that the connection type of the current network is the WiFi connection, the transfer module is further configured to upload data of an unfinished upload task to the server, or download data of an unfinished download task from the server, wherein the unfinished upload task or the unfinished download task is a previously suspended task in response to the detected network switching event of the switch from the WiFi connection to the non-WiFi connection, wherein the first detection module is further configured to:

set a preconfigured period based on a particular application; and trigger the detection of the current network connection type periodically based on the preconfigured period.

4. The system according to claim 3, wherein, to perform the data transfer, the transfer module is further configured to:

upload, to the server, local data corresponding to a selection of the user; or download, from the server, data corresponding to a selection of the user.

5. A mobile terminal coupled to a server by one or more networks, comprising:

a communication interface for accessing the one or more networks;

a memory module; and a processor coupled to the memory module and the communication interface for implementing a data transfer process, the processor being configured to:

detect a screen-click event or a key-press event from a user of the mobile terminal to transfer data;

when the screen-click event or the key-press event is detected, trigger the processor to detect a connection type of a current network between the mobile terminal and the server by using an API (Application Programming Interface) provided by a web browser on the mobile terminal;

when the processor detects that the connection type of the current network is a wireless fidelity (WiFi) connection, perform data transfer between the mobile terminal and the server; and when the processor detects that the connection type of the current network is a non-WiFi connection,
prompt the user of the mobile terminal whether to continue to perform the data transfer;
when the processor determines that the user makes a selection to continue to perform the data transfer, perform the data transfer, wherein the data includes image data, and performing the data transfer includes:
 detecting one or more network switching event during the data transfer;
 in response to each of the one or more detected network switching event, triggering the terminal to detect the connection type of the current network;
 determining that both a high-definition image and a standard-definition image corresponding to the image data are available;
 automatically downloading the high-definition image from the server without prompting the user if it is detected that the connection type of the current network is a WiFi connection; and
 automatically downloading the standard-definition image from the server after prompting the user if it is detected that the connection type of the current network is a non-WiFi connection; and
when the processor determines that the user does not choose any prompted option related to whether to continue the data transfer, suspend the data transfer between the mobile terminal and the server;
after the processor suspends the data transfer, continue detecting the current network connection type; and
when the processor detects that the connection type of the current network is the WiFi connection, upload data of an unfinished upload task to the server, or download data of an unfinished download task from the server, wherein the unfinished upload task or the unfinished download task is a previously suspended task in response to the detected network switching event of the switch from the WiFi connection to the non-WiFi connection,
wherein the processor is further configured to:
set a preconfigured period based on a particular application; and
trigger the detection of the current network connection type periodically based on the preconfigured period.

6. The mobile terminal according to claim 5, wherein, to perform the data transfer between the mobile terminal and the server, the processor is further configured to:
 upload, to the server, local data corresponding to a selection of the user; or
 download, from the server, data corresponding to a selection of the user.

* * * * *